(12) United States Patent
Nakagawa

(10) Patent No.: US 9,007,540 B2
(45) Date of Patent: Apr. 14, 2015

(54) ELECTRO-OPTICAL DEVICE AND ELECTRONIC APPARATUS

(75) Inventor: Masashi Nakagawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 402 days.

(21) Appl. No.: 12/974,758

(22) Filed: Dec. 21, 2010

(65) Prior Publication Data

US 2011/0157532 A1 Jun. 30, 2011

(30) Foreign Application Priority Data

Dec. 24, 2009 (JP) ................................ 2009-291959

(51) Int. Cl.
 *G02F 1/1343* (2006.01)
 *G02F 1/1333* (2006.01)
 *G02F 1/1362* (2006.01)

(52) U.S. Cl.
 CPC .... *G02F 1/136286* (2013.01); *G02F 1/136213* (2013.01)

(58) Field of Classification Search
 CPC .................... G02F 1/136213; G02F 1/133345; G02F 1/1368
 USPC .............................. 349/38, 39, 42, 43, 47, 138
 See application file for complete search history.

(56) References Cited

U.S. PATENT DOCUMENTS

| | | | | |
|---|---|---|---|---|
| 5,986,725 A | * | 11/1999 | Kim et al. | 349/43 |
| 2003/0160283 A1 | | 8/2003 | Tanaka et al. | |
| 2004/0046912 A1 | * | 3/2004 | Ishino | 349/122 |
| 2005/0168664 A1 | * | 8/2005 | Chae et al. | 349/38 |
| 2007/0023899 A1 | * | 2/2007 | Yudasaka | 257/734 |
| 2008/0204616 A1 | | 8/2008 | Fujita | |

FOREIGN PATENT DOCUMENTS

| | | |
|---|---|---|
| JP | 2003324201 A | 11/2003 |
| JP | 2007-36032 A | 2/2007 |
| JP | 2008209437 A | 9/2008 |

* cited by examiner

*Primary Examiner* — Jessica M Merlin
(74) *Attorney, Agent, or Firm* — Lowe Hauptman & Ham, LLP

(57) ABSTRACT

Provided is an electro-optical device including: a first conduction layer; and a second conduction layer which is disposed on the upper layer side of the first conduction layer with an insulation film interposed therebetween so that at least a part thereof overlaps with the first conduction layer in the plan view, wherein the insulation film is provided with a void portion formed in an area where the first conduction layer and the second conduction layer overlap with each other in the plan view.

7 Claims, 10 Drawing Sheets

ELECTRO-OPTICAL DEVICE AND ELECTRONIC APPARATUS

BACKGROUND

1. Technical Field

The present invention relates to an electro-optical device such as a liquid crystal device and an electronic apparatus such as a liquid crystal projector having the electro-optical device.

2. Related Art

In an electro-optical devices, a pixel electrode, a pixel switching TFT (Thin Film Transistor), and a wiring such as a scanning line and a data line are laminated as a conduction layer with an interlayer insulation film interposed therebetween. At the time of operating such an electro-optical device, parasitic capacitance is generated between two conduction layers disposed at different layers with the interlayer insulation film interposed therebetween, which may raise a problem where electromagnetic noise is generated in the conduction layers or signals are delayed.

For example, JP-A-2007-36032 discloses a technology that improves insulation properties between two wirings by forming a void portion or a space in addition to an insulation film between two wirings disposed at different layers in an interconnection substrate with a multi-layer interconnection structure.

However, according to the technology disclosed in JP-A-2007-36032, the width of the space is wider than the width of the upper layer side wiring. For this reason, when the upper layer side wiring is formed by etching in the manufacturing process, the etching may affect the lower layer side wiring via the space. As a result, there is a technical problem in that the lower layer side wiring may be cut.

SUMMARY

An advantage of some aspects of the invention is that it provides an electro-optical device capable of reducing parasitic capacitance and displaying a high-quality image, and an electronic apparatus having the electro-optical device.

According to an aspect of the invention, provided is an electro-optical device including: a first conduction layer; and a second conduction layer which is disposed on the upper layer side of the first conduction layer with an insulation film interposed therebetween so that at least a part thereof overlaps with the first conduction layer in the plan view, wherein the insulation film is provided with a void portion formed in an area where the first conduction layer and the second conduction layer overlap with each other in the plan view.

In the electro-optical device, particularly the insulation film provided between the first and second conduction layers of the lamination structure on the substrate is provided with a void portion that has, for example, a void therein and is formed in an area where the first and second conduction layers overlap with each other in the plan view of the substrate. For this reason, it is possible to reduce parasitic capacitance (in other words, electromagnetic coupling between the first and second conduction layers) generated between the first and second conduction layers compared with the case where no countermeasure is prepared and the void portion is not formed in the insulation film. Further, since the void portion is formed in an area where the first and second conduction layers overlap with each other in the plan view of the substrate, it is possible to prevent an accident where the first conduction layer is cut by etching when forming the second conduction layer disposed on the upper layer side of the first conduction layer by etching in the manufacturing process. Furthermore, according to the electro-optical device, since it is possible to reduce the parasitic capacitance using the void portion without thickening the film thickness of the insulation film, for example, an increase in the aspect ratio of a contact hole opened from the insulation film rarely occurs.

In the electro-optical device, the first conduction layer is a signal line that supplies image signals, and the second conduction layer is a capacitance line that includes a fixed potential side electrode constituting a capacitance element.

According to the aspect, it is possible to reduce parasitic capacitance generated between the signal line and the capacitance line. Accordingly, it is possible to reduce or prevent a delay of the image signal in the signal line caused by the parasitic capacitance. Therefore, it is possible to display a high-quality image.

According to another aspect of the invention, provided is an electronic apparatus including the electro-optical device of the above-described aspect. Accordingly, it is possible to realize various electronic apparatuses such as a projection type display device, a television, a cellular phone, an electronic note, a word processor, a viewfinder type or monitor direct view type video tape recorder, a workstation, a TV telephone, a POS terminal, and a touch panel. Further, as the electronic apparatus of the aspect, for example, an electrophorsis device such as an electronic paper, an electron emission device (Field Emission Display and Conduction Electron-Emitter Display), and a display device using the electrophorsis device and the electron emission device may be realized.

The effects and advantages of the aspect of the invention will become apparent in the embodiments to be described later.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described with reference to the accompanying drawings. In the description below, a TFT active matrix driving liquid crystal device having a driving circuit embedded therein will be described as an example of an electro-optical device of the invention.

First Embodiment

The liquid crystal device according to a first embodiment will be described with reference to FIGS. 1 to 8D.

First, an overall configuration of the liquid crystal device according to the embodiment will be described with reference to FIGS. 1 and 2.

Figure 1:
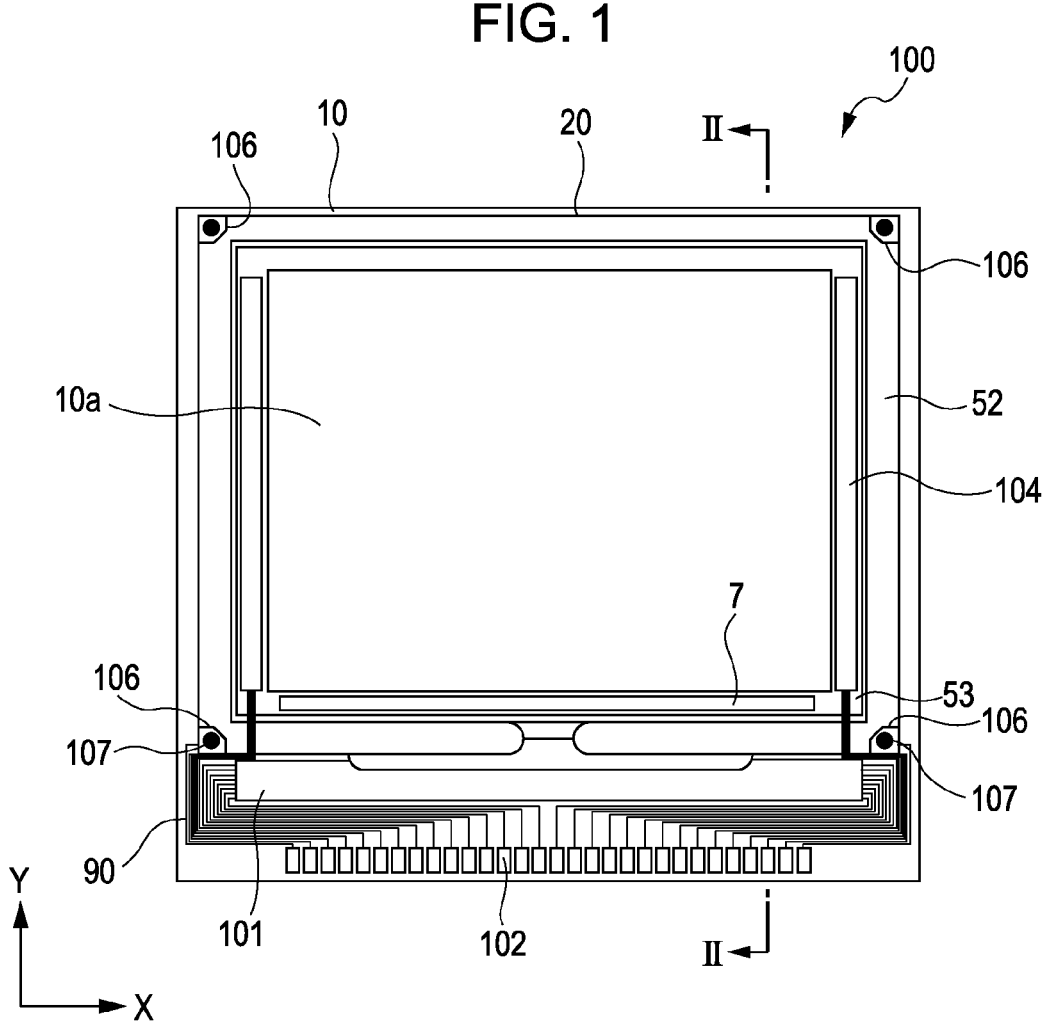
FIG. 1 is a plan view illustrating an overall configuration of a liquid crystal device according to a first embodiment.
Figure 2:
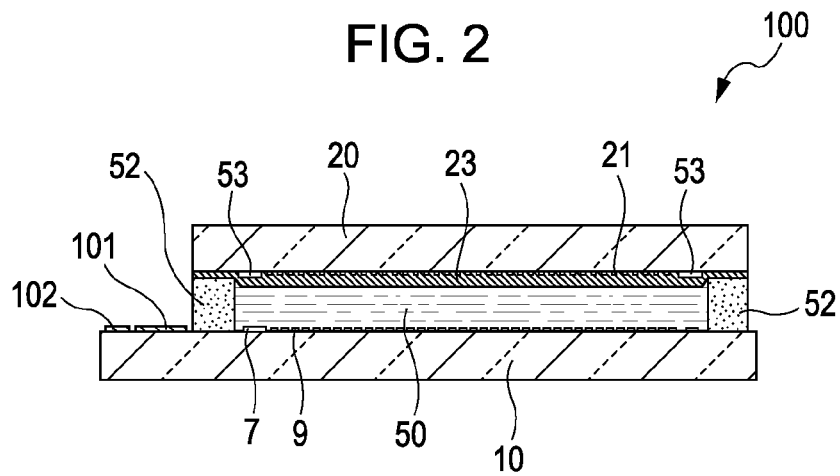
FIG. 2 is a cross-sectional view taken along the line II-II of FIG. 1.

FIG. 1 is a plan view illustrating a configuration of the liquid crystal device according to the embodiment, and FIG. 2 is a cross-sectional view taken along the line II-II of FIG. 1.

In FIGS. 1 and 2, a liquid crystal device 100 according to the embodiment has a structure in which a TFT array substrate 10 and a counter substrate 20 are disposed to face each other. Further, the TFT array substrate 10 is an example of a "substrate" according to the invention. A liquid crystal layer 50 is enclosed between the TFT array substrate 10 and the counter substrate 20. The TFT array substrate 10 and the counter substrate 20 are adhered to each other by a sealing material 52 that is formed in a sealing area located in the periphery of an image display area 10a.

In FIG. 1, a frame light shielding film 53 having a light shielding property and defining a frame area of the image display area 10a is provided on the counter substrate 20 so as to be parallel to the inside of the sealing area having the sealing material 52. In an area located on the outside of the sealing area having the sealing material 52 in the peripheral area, a data line driving circuit 101 and an external circuit connection terminal 102 are provided along one side of the TFT array substrate 10. A sampling circuit 7 is provided on the inside of the sealing area formed along the one side so as to be covered by the frame light shielding film 53. Further, scanning line driving circuits 104 are provided on the inside of the sealing areas formed along two sides adjacent to the one side so as to be covered by the frame light shielding film 53. In addition, a vertical conduction terminal 106 is disposed at an area facing each of the four corners of the counter substrate 20 in the TFT array substrate 10 so as to electrically connect both substrates to each other via a vertical conduction material 107. Accordingly, it is possible to electrically connect the TFT array substrate 10 and the counter substrate 20 to each other.

Drawn wires 90 are formed on the TFT array substrate 10 so as to electrically connect the external circuit connection terminal 102, the data line driving circuit 101, the scanning line driving circuit 104, the vertical conduction terminal 106, and the like to each other.

In FIG. 2, a lamination structure is formed on the TFT array substrate 10 by the pixel switching TFT or the wiring such as the scanning line or the data line. In the image display area 10a (refer to FIG. 1), pixel electrodes 9 are formed in a matrix shape on the upper layer of the pixel switching TFT or the wiring such as the scanning line or the data line. An alignment film is formed on the pixel electrodes 9. On the other hand, a light shielding film 23 is formed on a surface facing the TFT array substrate 10 in the counter substrate 20. The light shielding film 23 is formed of, for example, a light shielding metallic film or the like, and is patterned in, for example, a lattice shape or the like within the image display area 10a on the counter substrate 20. Then, counter electrodes 21 formed of a transparent conduction material such as ITO (Indium Tin Oxide) are formed on the light shielding film 23 in a solid shape so as to face the plural pixel electrodes 9. An alignment film is formed on the counter electrode 21. In addition, the liquid crystal layer 50 is formed of liquid crystals obtained by mixing, for example, one or more types of nematic liquid crystal, and takes a predetermined alignment state between the pair of alignment films.

During the operation of the liquid crystal device 100, light is incident to the liquid crystal layer 50, and the incident light is emitted as display light in accordance with the alignment state of the liquid crystal layer 50, thereby displaying an image on the image display area 10a.

Further, although not shown in the drawings, an inspection circuit or an inspection pattern for inspecting quality, defects, or the like of the liquid crystal device at the time of manufacturing or shipping the liquid crystal device may be formed on the TFT array substrate 10 in addition to the data line driving circuit 101 and the scanning line driving circuit 104.

Next, an electrical configuration of the pixel unit of the liquid crystal device according to the embodiment will be described with reference to FIG. 3.

Figure 3:
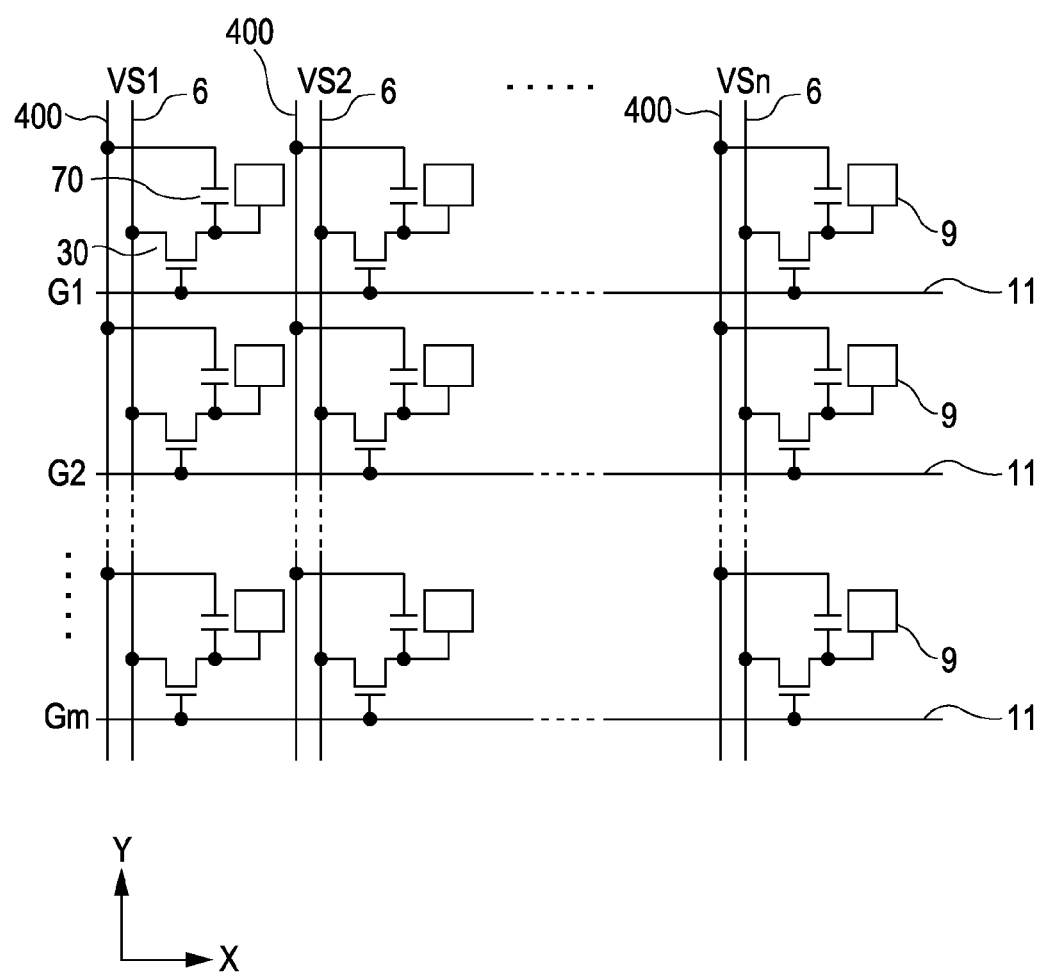
FIG. 3 is an equivalent circuit diagram of plural pixel units of the liquid crystal device according to the first embodiment.

FIG. 3 is an equivalent circuit diagram illustrating various elements, wirings, and the like of the plural pixels formed in a matrix shape and forming the image display area of the liquid crystal device.

In FIG. 3, the pixel electrodes 9 and TFTs 30 switching and controlling the pixel electrodes 9 respectively are formed at the plural pixels formed in a matrix shape to form the image display area 10a of the liquid crystal device 100 according to the embodiment, and the data line 6 receiving image signals is electrically connected to the source of the TFT 30. The image signals VS1, VS2, . . . , VSn written to the data line 6 may be sequentially supplied, or may be supplied to each group in the plural data lines 6 adjacent to each other.

Further, the scanning line 11 is electrically connected to the gate of the TFT 30, and scanning signals G1, G2, . . . , Gm are sequentially applied in the form of a pulse to the scanning line 11 at a predetermined timing. The pixel electrode 9 is electrically connected to the drain of the TFT 30, and when the switch of the TFT 30 as the switching element is closed by a predetermined period of time, the image signals VS1, VS2, . . . , VSn supplied from the data line 6 are written at a predetermined timing.

The predetermined levels of image signals VS1, VS2, . . . , VSn written to the liquid crystals via the pixel electrode 9 are stored for a predetermined period of time between the counter electrodes 21 (refer to FIG. 2) formed on the counter substrate 20 (refer to FIG. 2). In the liquid crystals, the alignment or order of the molecular association changes in accordance with a level of a voltage applied thereto, thereby modulating the light and enabling the grayscale display. In the case of a normally white mode, the transmissivity of the incident light decreases in accordance with the voltage applied in pixel units. In the case of a normally black mode, the transmissivity of the incident light increases in accordance with a voltage applied by the unit of the pixel. Accordingly, the light having a contrast in accordance with the image signal is emitted from the liquid crystal device 100.

Here, in order to prevent the leakage of the stored image signal, a storage capacitor 70 is added in parallel to the liquid crystal capacitance formed between the pixel electrode 9 and the counter electrode 21. Further, the storage capacitor 70 is an example of a "capacitance element" according to the invention. One electrode of the storage capacitor 70 is connected to the drain of the TFT 30 in parallel to the pixel electrode 9, and the other electrode thereof is connected to a capacitance line 400 for fixing potential so as to obtain a constant potential.

Next, a characteristic void portion of the liquid crystal device according to the embodiment will be described with reference to FIGS. 4 to 8D.

Figure 4:
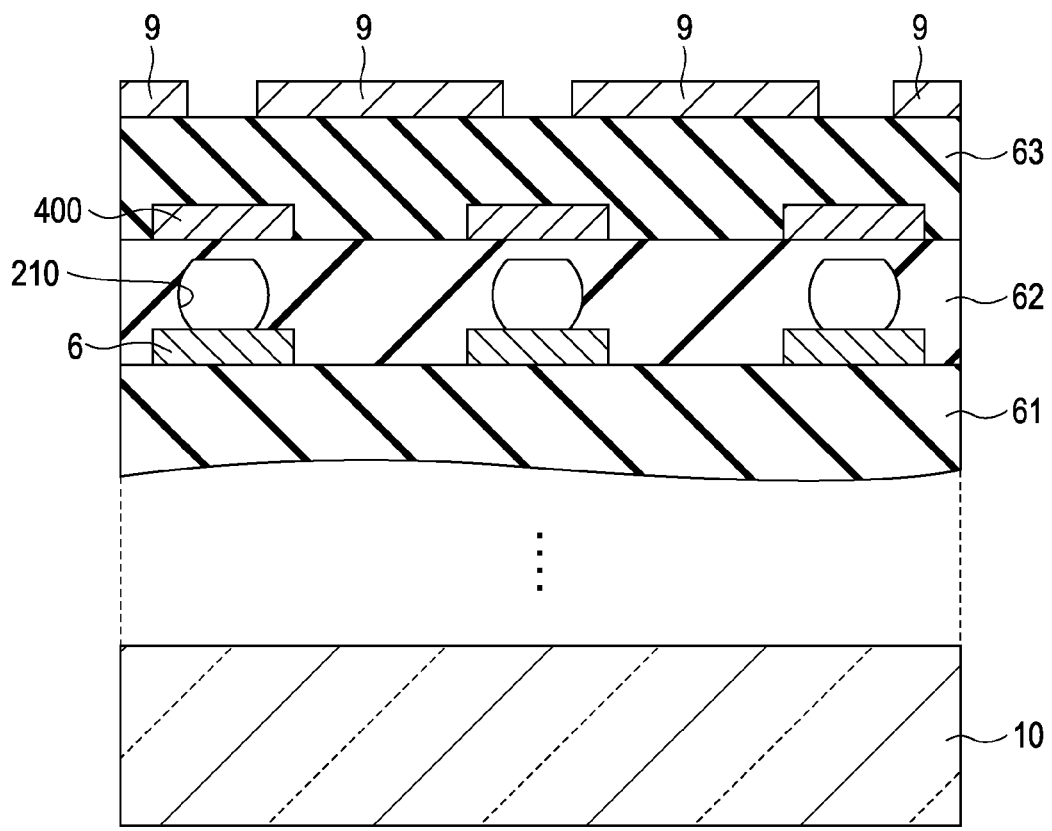
FIG. 4 is a cross-sectional view illustrating a lamination structure in an image display area on a TFT array substrate included in the liquid crystal device according to the first embodiment.

FIG. 4 is a cross-sectional view illustrating a lamination structure of an image display area on a TFT array substrate included in the liquid crystal device according to the embodiment. Further, in FIG. 4, various components (for example, the scanning line 11, the TFT 30, the storage capacitor 70, and the like described above referring to FIG. 3) provided on the lower layer side of an interlayer insulation film 61 as a base material of the data line 6 on the TFT array substrate 10 are not shown.

In FIG. 4, the data line 6 as an example of a "first conduction layer" or a "signal line" according to the invention is provided on the interlayer insulation film 61 provided on the TFT array substrate 10. The data line 6 (refer to FIG. 3) is formed to extend in the first direction (for example, the Y direction) in the image display area 10a (refer to FIG. 1).

The interlayer insulation film 62 is provided on the upper layer side of the data line 6. Further, the interlayer insulation film 62 is an example of an "insulation film" according to the invention. The interlayer insulation film 62 is formed of, for example, silicon oxide ($SiO_2$) and has specific permittivity of about 3.4.

The capacitance line 400 as an example of a "second conduction layer" according to the invention is provided on the interlayer insulation film 62. The capacitance line 400 has a portion formed to partly overlap with the data line 6 and extend in the first direction (for example, the Y direction) (refer to FIG. 3) in the image display area 10a (refer to FIG. 1).

Plural pixel electrodes 9 are provided on the upper layer side of the capacitance line 400 with the interlayer insulation film 63 interposed therebetween. Each of the pixel electrodes 9 is provided at each of the plural pixels formed in a matrix shape and forming the image display area 10a (refer to FIG. 1).

In the embodiment, particularly, a void portion (or a "void portion") 210 is formed on the interlayer insulation film 62 provided between the capacitance line 400 and the data line 6 in the lamination structure on the TFT array substrate 10.

Figure 5:
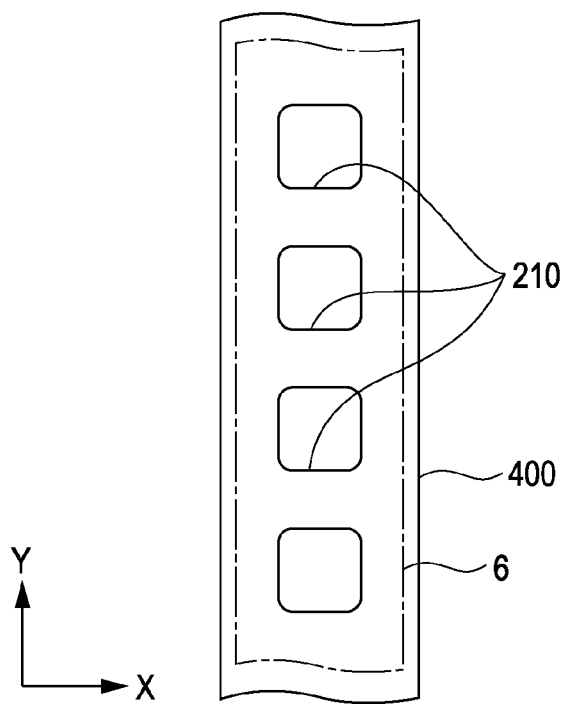
FIG. 5 is a schematic diagram illustrating a planar positional relationship of a void portion, a capacitance line, and a data line on the TFT array substrate of the liquid crystal device according to the first embodiment.

FIG. 5 is a schematic diagram illustrating a planar positional relationship of the void portion, the capacitance line, and the data line on the TFT array substrate of the liquid crystal device according to the embodiment.

In FIGS. 4 and 5, the void portion 210 is formed in an area where the data line 6 and the capacitance line 400 overlap with each other in a plan view of the TFT array substrate 10. The inside of the void portion 210 is formed as a cavity, and the void portion 210 has specific permittivity of about 1. As shown in FIG. 5, plural void portions 210 are provided at each data line 6 so as to be arranged in the extension direction of the data line 6.

Accordingly, it is possible to reduce parasitic capacitance (in other words, electromagnetic coupling between the data line 6 and the capacitance line 400) generated between the data line 6 and the capacitance line 400 compared with the case where no countermeasure is prepared and the void portion 210 is not formed on the interlayer insulation film 62. In other words, according to the embodiment, since the void portion 210 having a specific permittivity of about 1 is provided between the data line 6 and the capacitance line 400, it is possible to reduce parasitic capacitance generated between the data line 6 and the capacitance line 400 by a degree corresponding to the void portion 210 compared with the case where only the interlayer insulation film 62 having a specific permittivity of about 3.4 is provided between the data line 6 and the capacitance line 400. Accordingly, it is possible to reduce or prevent a delay of the image signal of the data line 6 caused by the parasitic capacitance between the data line 6 and the capacitance line 400. Accordingly, it is possible to increase the driving frequency driving the data line 6 using the data line driving circuit 101. That is, it is possible to increase the operation speed of the liquid crystal device 100. As a result, according to the liquid crystal device 100 of the embodiment, it is possible to display a high-quality image.

Further, particularly in the embodiment, since the void portion 210 is formed in an area where the data line 6 and the capacitance line 400 overlap with each other in a plan view of the TFT array substrate 10, it is possible to prevent an accident where the data line 6 is cut by an etching when the capacitance line 400 disposed on the upper layer side of the data line 6 is formed by the etching in the manufacturing process. Furthermore, for example, such an accident may occur when a part of the interlayer insulation film 62 on the void portion 210 is removed by an etching for forming the capacitance line 400 and a part of the data line 6 beneath the void portion 210 is removed upon forming the capacitance line 400 so as to have a narrower width than that of the void portion 210.

Further, according to the embodiment, since it is possible to reduce the parasitic capacitance by using the void portion 210 without thickening the film thickness of the interlayer insulation film 62, an increase in the aspect ratio of the contact hole opened from the interlayer insulation film 62 rarely occurs.

Figure 6:
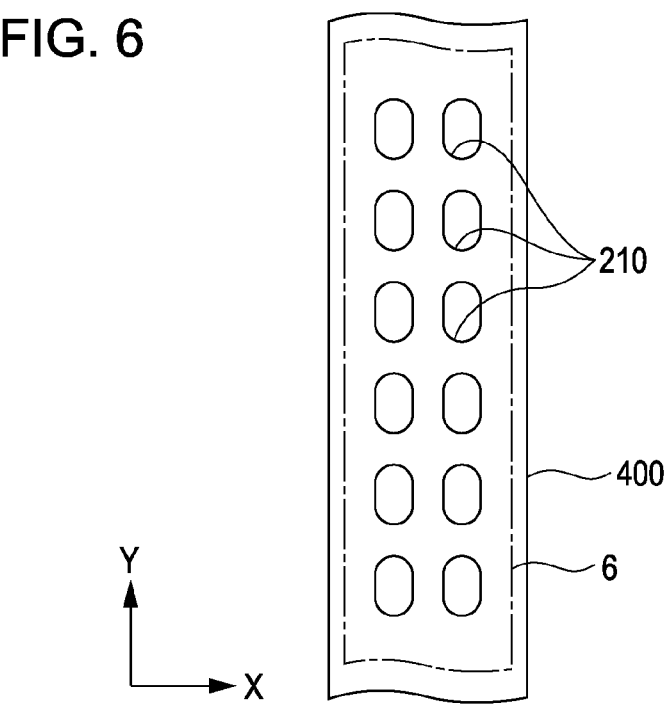
FIG. 6 is a schematic diagram illustrating a planar configuration of a void portion according to a first modified example.

FIG. 6 is a schematic diagram illustrating a planar configuration of the void portion according to a first modified example. As shown in FIG. 6, plural void portions 210 may be arranged in each data line 6 in the extension direction (for example, the Y direction) of the data line 6, and may be arranged in the direction (for example, the X direction) intersecting the extension direction of the data line 6.

Figure 7:
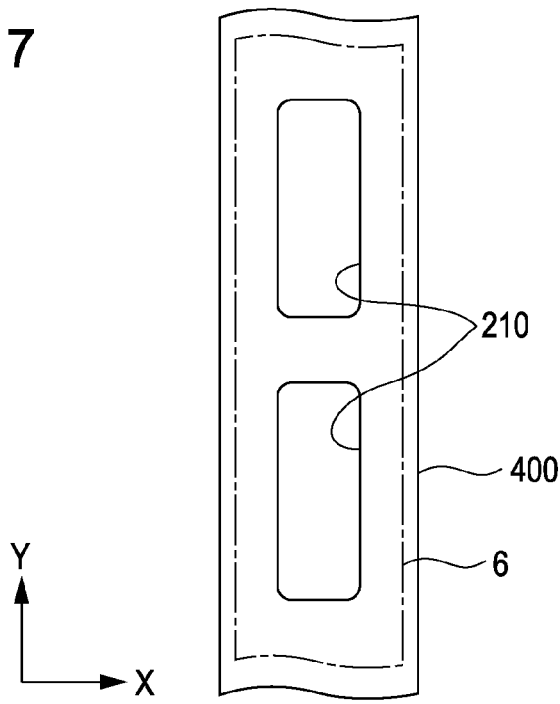
FIG. 7 is a schematic diagram illustrating a planar configuration of a void portion according to a second modified example.

FIG. 7 is a schematic diagram illustrating a planar configuration of the void portion according to a second modified example.

As shown in FIG. 7, the void portion 210 may be formed as a rectangular shape of which the width in the extension direction (for example, the Y direction) of the data line 6 is larger than the width in the direction (for example, the X direction) intersecting the extension direction of the data line 6.

As described above, according to the liquid crystal device 100 of the embodiment, it is possible to reduce parasitic capacitance between the data line 6 and the capacitance line 400, and to display a high-quality image.

Next, a method of manufacturing the liquid crystal device according to the above-described embodiment will be described with reference to FIGS. 8A to 8D.

FIGS. 8A to 8D are process diagrams illustrating steps of a process of manufacturing the liquid crystal device according to the first embodiment. Further, FIGS. 8A to 8D correspond to the cross-sectional view shown in FIG. 4 (however, the TFT array substrate 10 is omitted in the drawing). In the description below, the step of forming the void portion 210 of the liquid crystal device 100 according to the above-described embodiment will be mainly described.

Figure 8A:
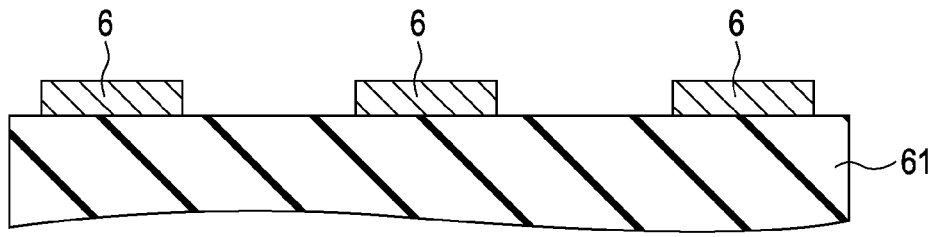
FIGS. 8A to 8D are process diagrams illustrating steps of a manufacturing process of the liquid crystal device according to the first embodiment.

First, in the step shown in FIG. 8A, the data line 6 is formed of, for example, a metallic film such as aluminum so as to be provided on the interlayer insulation film 61 provided on the TFT array substrate 10.

Figure 8B:
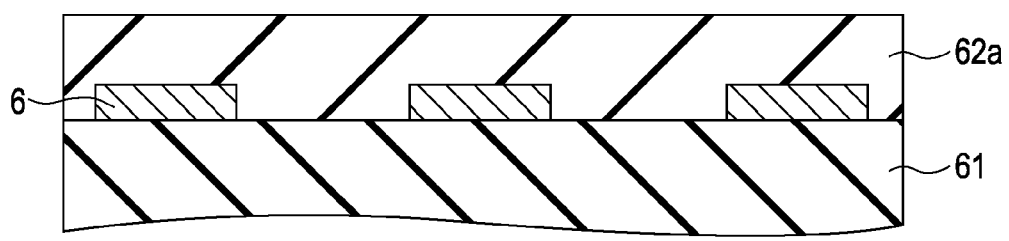

Subsequently, in the step shown in FIG. 8B, an insulation film 62a is formed of, for example, $SiO_2$ or the like so as to cover the data line 6.

Figure 8C:
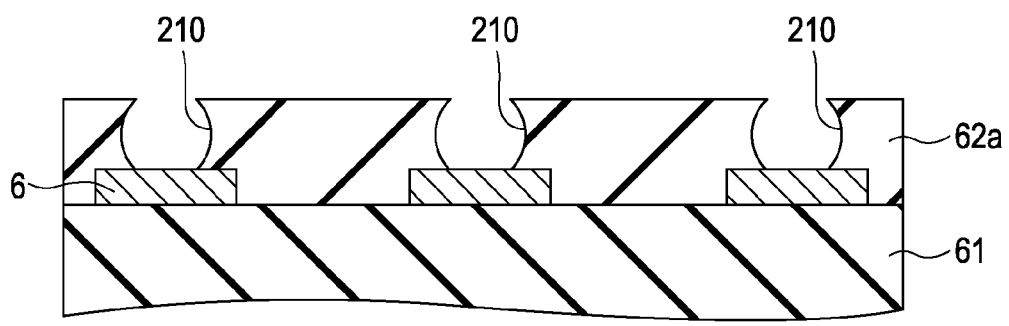

Subsequently, in the step shown in FIG. 8C, the void portion 210 is formed by performing an etching on a predetermined area of the insulation film 62a. At this time, the void portion 210 is formed in an area where the data line 6 and the capacitance line 400 (FIG. 4) to be described in the subsequent step overlap with each other in the plan view of the TFT array substrate 10. Further, at this time, the side wall of the void portion 210 is formed as a bowing shape (or a bow shape). In this case, since the opening portion of the void portion 210 can be formed to be smaller than the inside of the void portion 210 in the plan view of the TFT array substrate 10, it is possible to easily block the opening portion of the void portion 210 by using the insulation film 62b to be described later (in other words, the opening portion of the void portion 210 can be sealed without substantially or practically forming the insulation film 62b in the inside of the void portion 210).

Figure 8D:
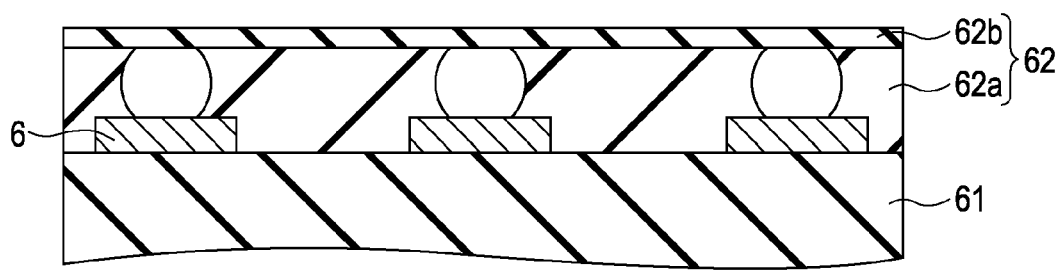

Subsequently, in the step shown in FIG. 8D, the insulation film 62b is formed of, for example, $SiO_2$ or the like so as to seal the opening portion of the void portion 210. Accordingly, it is possible to form the interlayer insulation film 62 having the insulation films 62a and 62b and the void portion 210.

Subsequently, the capacitance line 400 (refer to FIG. 4) is formed on the interlayer insulation film 62 by, for example, a metallic film or the like. Subsequently, the pixel electrode 9 (refer to FIG. 4) is formed on the upper layer side of the capacitance line 400 with the interlayer insulation film 63 interposed therebetween.

In this way, the void portion 210 of the liquid crystal device 100 according to the embodiment may be formed.

Second Embodiment

A liquid crystal device according to a second embodiment will be described with reference to FIGS. 9 to 12.

A part of the configuration of the liquid crystal device according to the second embodiment is different from the configuration of the liquid crystal device according to the first embodiment, and the other configurations are substantially equal to each other. For this reason, in the second embodiment, the points different from the first embodiment will be described in detail, and the description of the similar points will be appropriately omitted.

Figure 9:
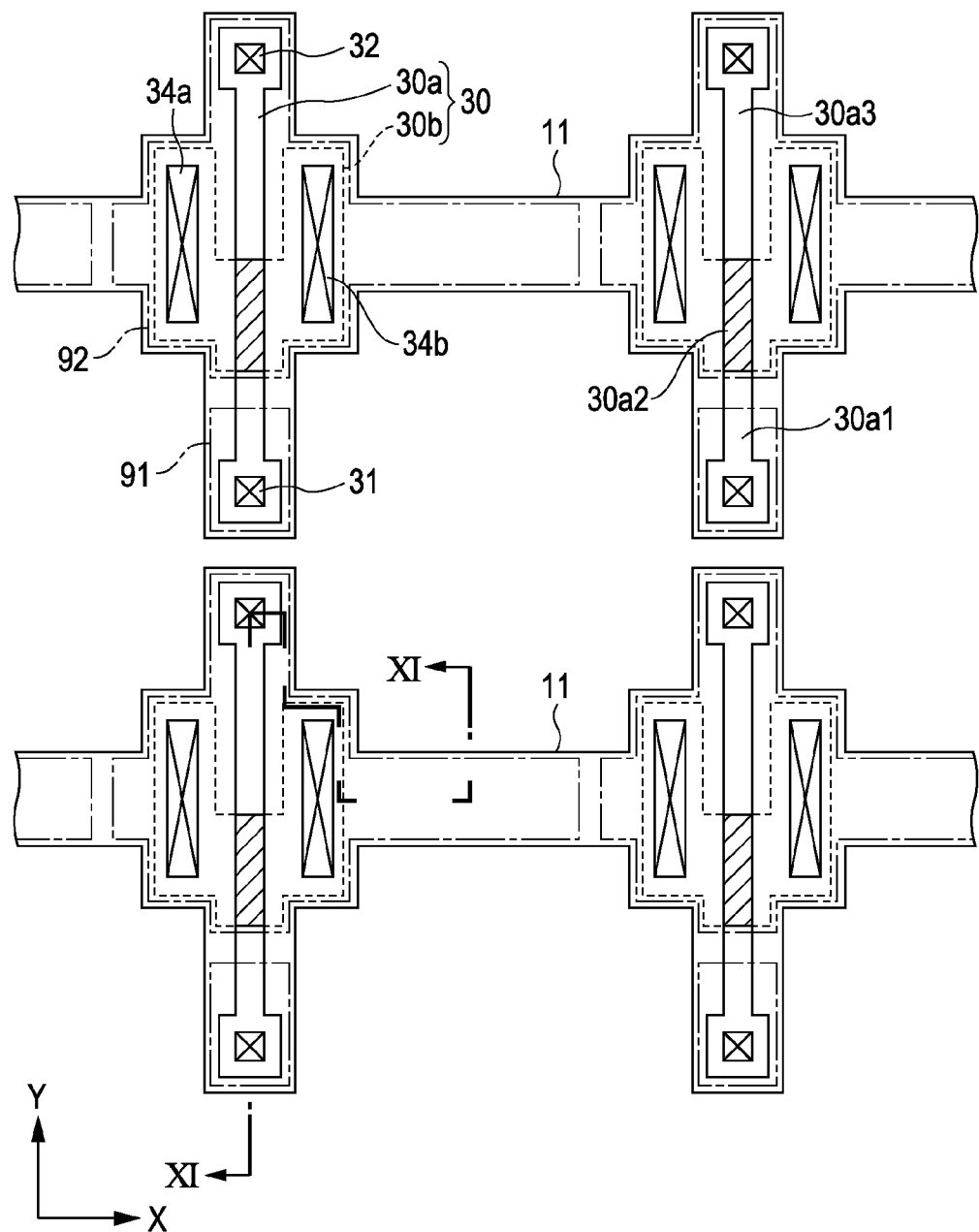
FIG. 9 is a (first) plan view visibly illustrating the positional relationship of layers forming a lamination structure on a TFT array substrate of a liquid crystal device according to a second embodiment.
Figure 10:
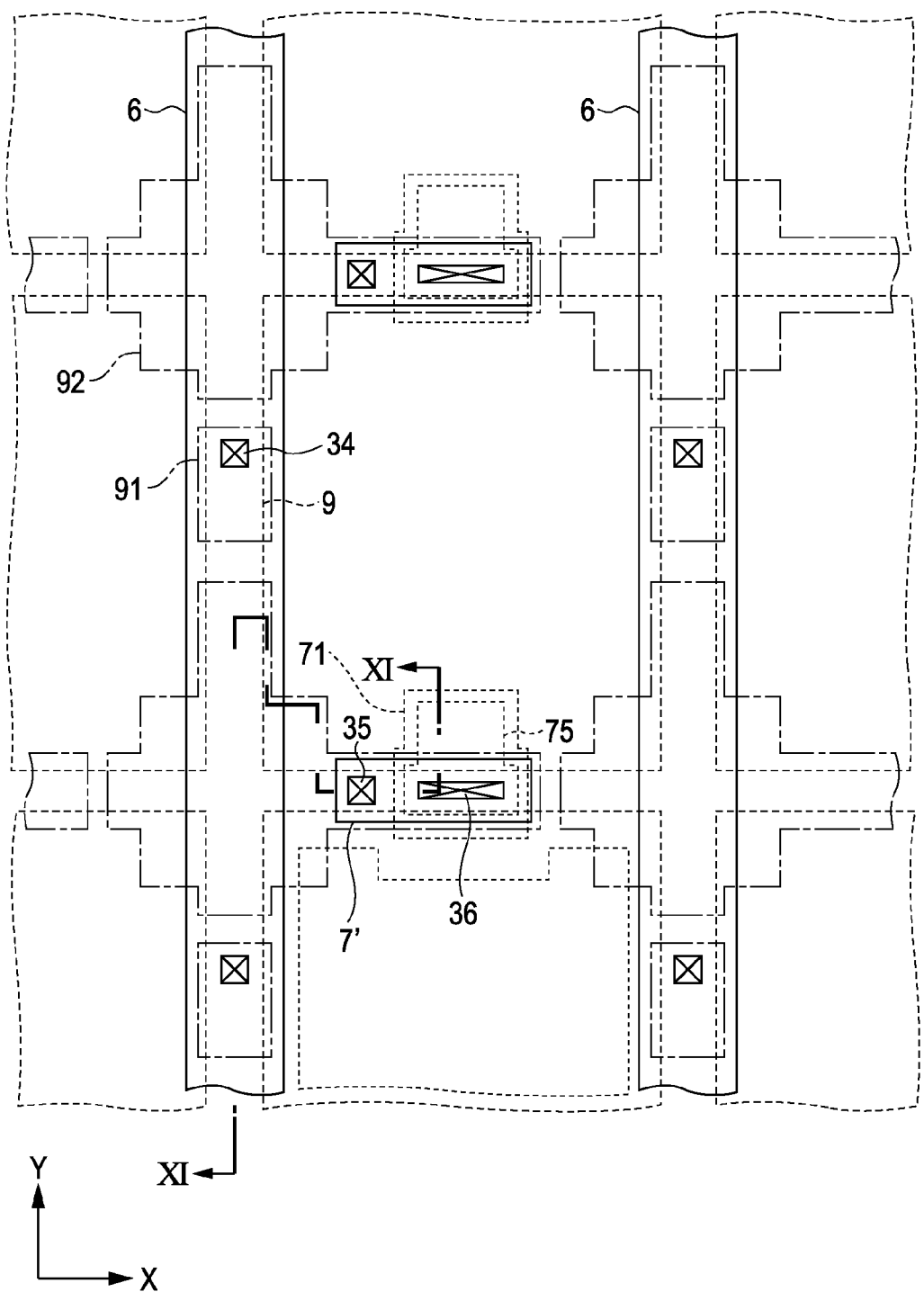
FIG. 10 is a (second) plan view visibly illustrating the positional relationship of layers forming a lamination structure on the TFT array substrate of the liquid crystal device according to the second embodiment.
Figure 11:
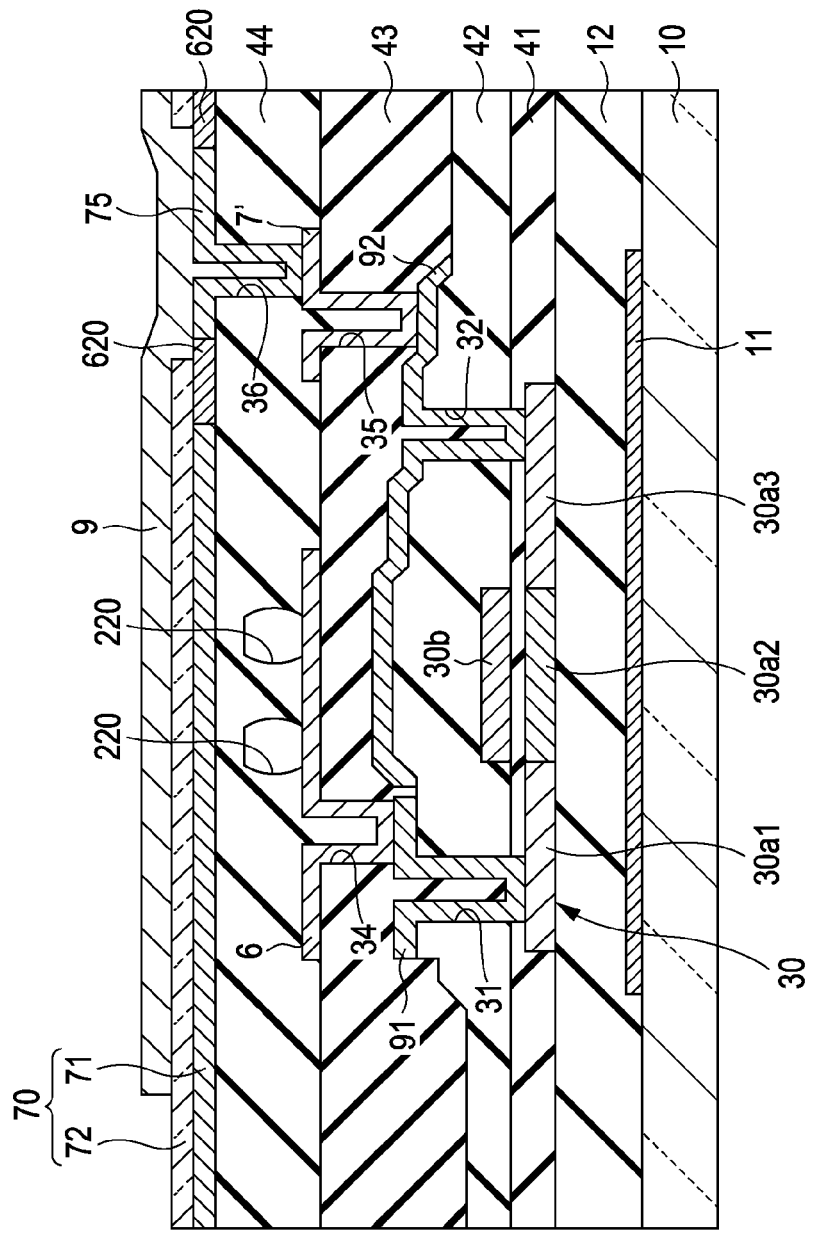
FIG. 11 is a (first) cross-sectional view illustrating a lamination structure on the TFT array substrate of the liquid crystal device according to the second embodiment.

FIGS. 9 and 10 are plan views visibly illustrating the positional relationship of layers forming a lamination structure on the TFT array substrate of the liquid crystal device according to the second embodiment. FIG. 11 is a cross-sectional view illustrating a lamination structure on the TFT array substrate of the liquid crystal device according to the second embodiment. Further, FIG. 9 illustrates the layers on the lower layer side of a fourth relay layer 91 and a third relay layer 92, and FIG. 10 illustrates the layers on the upper layer side of the fourth relay layer 91 and the third relay layer 92. In FIGS. 9, 10, and 11, the scales of the layers and members are depicted differently from the real sizes so that the sizes of the layers and the members can be recognized in the drawings. FIG. 11 illustrates a cross-section taken along the line XI-XI of FIGS. 9 and 10. However, as described above, since the scales of the layers and the members are depicted differently from the real scales, a part of the layers and the members do not correspond to the line XI-XI.

In FIGS. 9 and 11, the scanning line 11 is disposed in the X direction on the TFT array substrate 10, and the TFT 30 having the semiconductor layer 30a and the gate electrode 30b is disposed on the upper layer side of the scanning line 11 with an underlying insulation film 12 interposed therebetween.

The scanning line 11 is formed of, a light shielding conduction material such as W (tungsten), Ti (titanium), or TiN (titanium nitride), and is formed as a shape including the semiconductor layer 30a in the plan view of the TFT array substrate 10.

The semiconductor layer 30a includes a source area 30a1, a channel area 30a2, and a drain area 30a3. Here, an LDD (Lightly Doped Drain) area is formed between the channel area 30a2 and the source area 30a1 or between the channel area 30a2 and the drain area 30a3.

The gate electrode 30b is formed on the upper layer side of the semiconductor layer 30a with a gate insulation film 41 interposed therebetween in an area overlapping with the channel area 30a2 of the semiconductor layer 30a in the plan view of the TFT array substrate 10. The gate electrode 30b is formed of, for example, a conductive polysilicon, and is electrically connected to the scanning line 11 disposed on the lower layer side via contact holes 34a and 34b.

The source area 30a1 of the TFT 30 is electrically connected to the fourth relay layer 91 formed on the first interlayer insulation film 41 via the contact hole 31. On the other hand, the drain area 30a3 is electrically connected to the third relay layer 92 flush with the fourth relay layer 91 via the contact hole 32.

In FIGS. 10 and 11, the fourth relay layer 91 is electrically connected to the data line 6 formed on the second interlayer insulation film 42 via the contact hole 34. On the other hand, the third relay layer 92 is electrically connected to a second relay layer 7' flush with the data line 6 via the contact hole 34. The second relay layer 7' is electrically connected to the first relay layer 75 flush with a capacitance electrode 71 to be described later via the contact hole 36. Further, the first relay layer 75 is electrically connected to the pixel electrode 9. That is, the pixel electrode 9 and the drain area 30a3 of the TFT 30 are electrically connected to each other via the third relay layer 92, the second relay layer 7', and the first relay layer 75.

A third interlayer insulation film 44 is formed on the upper layer side of the data line 6 and the second relay layer 7', and the storage capacitor 70 is formed thereon. Further, the third interlayer insulation film 44 is an example of an "insulation film" according to the invention. The third interlayer insulation film 44 is formed of $SiO_2$, and has specific permittivity of about 3.4.

The capacitance electrode 71 formed on the third interlayer insulation film 44 functions as a fixed potential side electrode of the storage capacitor 70 electrically connected in parallel to the liquid crystal capacitance, and is electrically connected to the above-described capacitance line 400 shown in FIG. 3 so as to be maintained at a fixed potential. Further, the capacitance electrode 71 is an example of a "second conduction layer" according to the invention. The capacitance electrode 71 is formed as a transparent electrode formed of an ITO film. Since the capacitance electrode 71 is formed of the ITO film, even when the capacitance electrode 71 is formed to overlap with the image display area 10a including an opening area, the transmissivity is not substantially or practically reduced.

The capacitance electrode 71 includes an opening portion which is formed to surround the first relay layer 75 formed as an island shape and extend to two pixels adjacent to each other. The storage capacitor 70 is formed in a portion excluding the opening portion of the capacitance electrode 71 and a portion facing the pixel electrode 9.

The first relay layer 75 is formed on the inside the opening portion of the capacitance electrode 71 in the plan view of the TFT array substrate 10. The second relay layer 7' is formed between the pixels at a position overlapping with the extension portion of the scanning line 11, and the first relay layer 75 is formed as an elongated shape in the extension direction of the data line 6 from the second relay layer 7'. That is, the first relay layer 75 protrudes in a direction facing the pixel electrode 9 from the position connected to the second relay layer 7' via the contact hole 36. Then, at this portion, the first relay layer 75 and the pixel electrode 9 are connected to each other.

A dielectric film 72 is formed on the capacitance electrode 71. The dielectric film 72 has an opening portion formed at a portion having the first relay layer 75, and is formed as a solid shape so as to cover the capacitance electrode 71. The dielectric film 72 is formed of a transparent dielectric material such as alumina or silicon nitride.

The pixel electrode 9 is formed on the dielectric film 72. As shown in FIG. 10, the pixel electrode 9 is formed as an island shape for each of the pixels divided in a matrix shape by the data line 6 and the scanning line 11. Further, although not shown in the drawings, an alignment film is formed on the pixel electrode 9 so as to regulate the alignment state of the liquid crystal molecules included in the liquid crystal layer 50 (refer to FIG. 2).

In the embodiment, the pixel electrode 9 also functions as one electrode of the storage capacitor 70 in addition to the original function that controls the alignment state of the liquid crystal molecules constituting the liquid crystal layer 50 by the use of a voltage applied thereto. That is, since the pixel electrode 9 is used as a capacitance electrode facing the capacitance electrode 71, it is possible to simplify the lamination structure compared with the case where the capacitance electrode facing the capacitance electrode 71 is provided on a layer different from the pixel electrode 9 so as to be separated from the pixel electrode 9 in the dielectric film 72. Accordingly, it is advantageous in that the precision of the pixel size can be easily improved.

A step reduction film 620 is formed in an area (refer to FIG. 11) without the capacitance electrode 71 and the first relay layer 75 on the third interlayer insulation film 44. The step reduction film 620 is formed so that the front surfaces of the capacitance electrode 71 and the step reduction film 620 are substantially formed at the same level.

Figure 12:
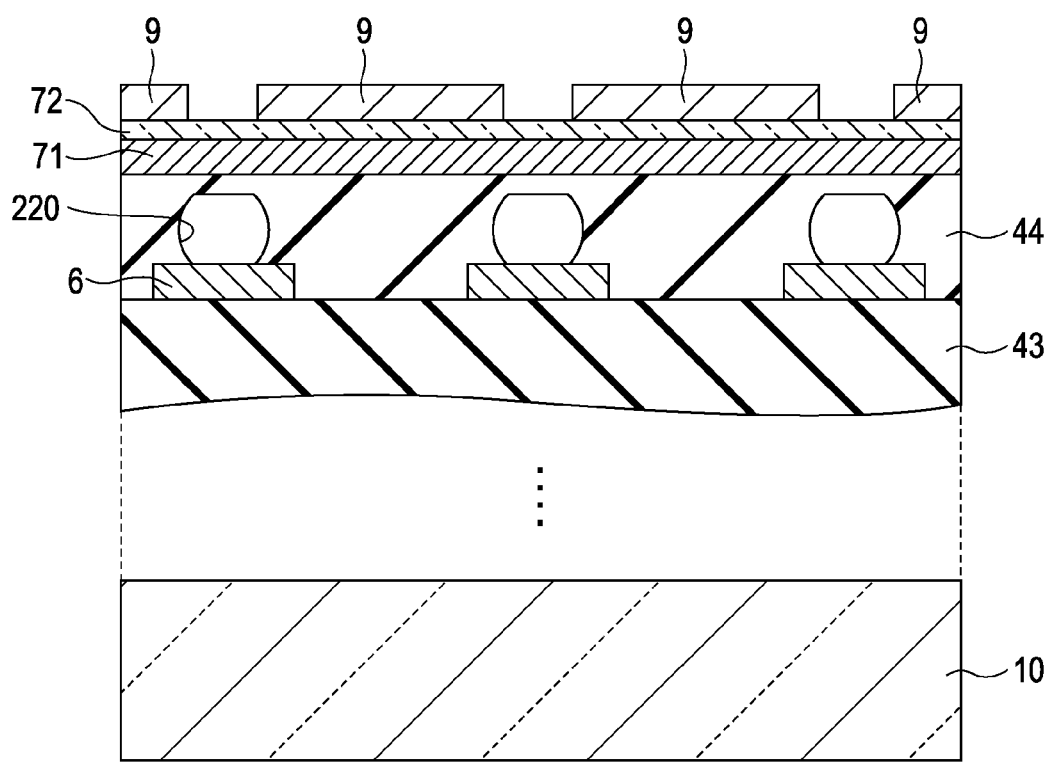
FIG. 12 is a (second) cross-sectional view illustrating a lamination structure on the TFT array substrate of the liquid crystal device according to the second embodiment.

FIG. 12 is a cross-sectional view illustrating a lamination structure on the TFT array substrate 10 when the lamination structure on the TFT array substrate 10 is cut in the line along the arrangement direction (that is, the X direction) of the data lines 6 so as to include the plural data lines 6. Further, in FIG. 12, various components (for example, the scanning line 11, the TFT 30, and the like) provided on the lower layer side of the third interlayer insulation film 44 as a base material of the data line 6 on the TFT array substrate 10 are not shown.

In FIGS. 11 and 12, particularly in the embodiment, a void portion 220 is formed in the third interlayer insulation film 44 provided between the data line 6 and the capacitance electrode 71 in the lamination structure on the TFT array substrate 10. The void portion 220 is formed in an area where the data line 6 and the capacitance electrode 71 overlap with each other in the plan view on the TFT array substrate 10. The inside of the void portion 220 is formed as a cavity, and the void portion 220 has specific permittivity of about 1. For example, plural void portions 220 are provided at each data line 6 so as to be arranged in the extension direction of the data line 6 as in the void portion 210 of the first embodiment described with reference to FIG. 5.

Accordingly, it is possible to reduce parasitic capacitance (in other words, electromagnetic coupling between the data line 6 and the capacitance electrode 71) generated between the data line 6 and the capacitance electrode 71 compared with the case where no countermeasure is prepared and the void portion 220 is not formed on the third interlayer insulation film 44. In other words, according to the embodiment, since the void portion 220 having a specific permittivity of about 1 is provided between the data line 6 and the capacitance electrode 71, it is possible to reduce parasitic capacitance generated between the data line 6 and the capacitance electrode 71 by at least a degree corresponding to the void portion 220 compared with the case where only the third interlayer insulation film 44 having a specific permittivity of about 3.4 is provided between the data line 6 and the capacitance electrode 71. Accordingly, it is possible to reduce or prevent a delay of the image signal of the data line 6 caused by the parasitic capacitance between the data line 6 and the capacitance electrode 71. Accordingly, it is possible to increase the driving frequency driving the data line 6 using the data line driving circuit 101. That is, it is possible to increase the operation speed of the liquid crystal device. As a result, according to the liquid crystal device of the embodiment, it is possible to display a high-quality image.

Electronic Apparatus

Figure 13:
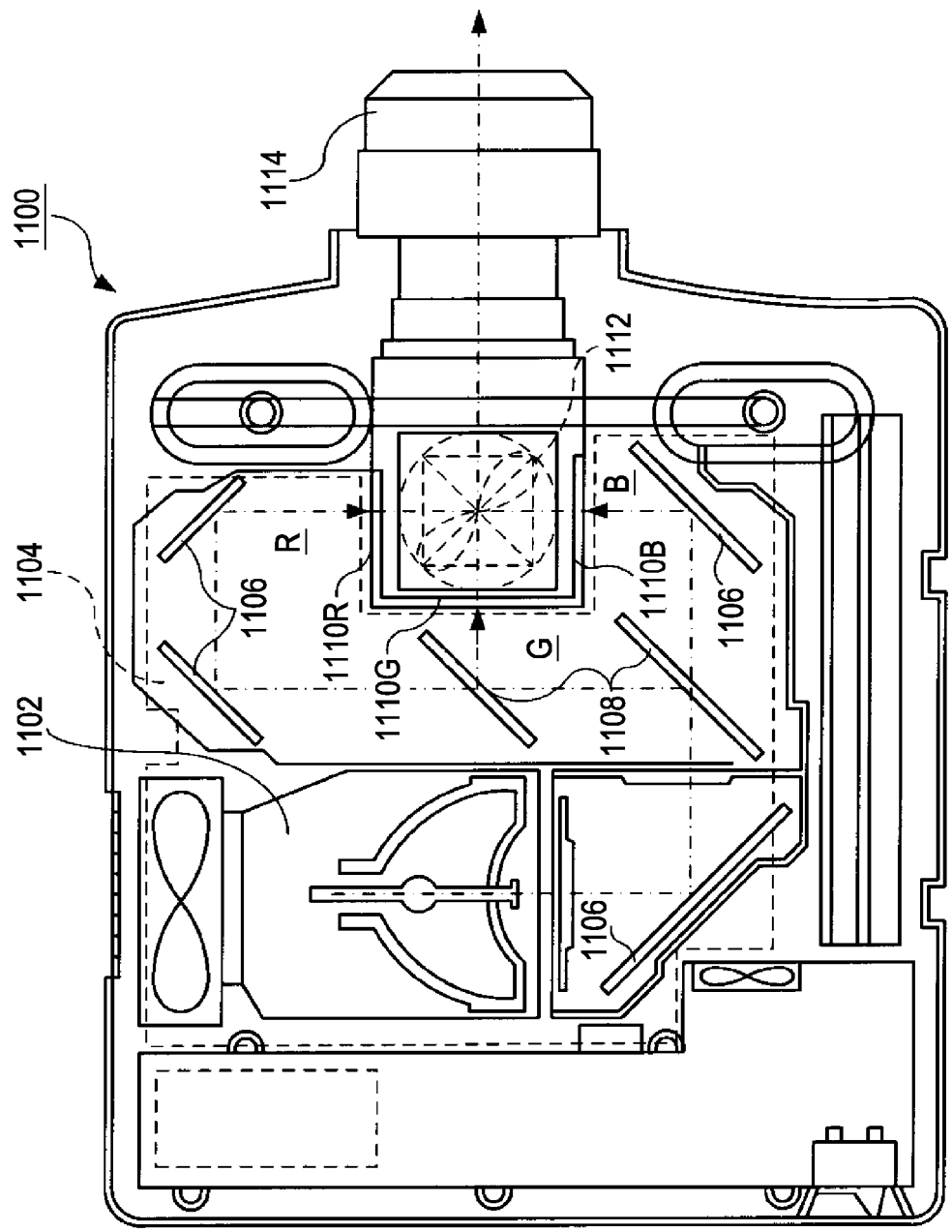
FIG. 13 is a plan view illustrating a configuration of a projector as an example of an electronic apparatus to which an electro-optical device is applied.

Next, a case will be described in which the liquid crystal device as the electro-optical device is applied to various electronic apparatuses. Here, a projector using the liquid crystal device as a light bulb will be described. FIG. 13 is a plan view illustrating a configuration example of the projector. As shown in FIG. 13, a projector 1100 includes a lamp unit 1102 that is formed as a white light source such as a halogen lamp. The light emitted from the lamp unit 1102 is divided into three primary colors of RGB by four mirrors 1106 and two dichroic mirrors 1108 disposed inside a light guide 1104, and the divided lights are respectively incident to liquid crystal panels 1110R, 1110B, and 1110G as light bulbs corresponding to the primary colors.

The configuration of the liquid crystal panels 1110R, 1110B, and 1110G is the same as that of the above-described liquid crystal device, and the liquid crystal panels are respectively driven by the primary color signals of R, G, and B supplied from an image signal processing circuit. Then, the light modulated by the liquid crystal panel is incident to a dichroic prism 1112 in three directions. In the dichroic prism 1112, the lights of R and B are bent by 90°, and the light of G straightly moves. Accordingly, respective colors of the images are synthesized, and hence a color image is projected onto a screen or the like via a projection lens 1114.

Here, as for the images displayed by the liquid crystal panels 1110R, 1110B, and 1110G, the image displayed by the liquid crystal panel 1110G needs to be left-right reversed with respect to the images displayed by the liquid crystal panels 1110R and 1110B.

Further, since the lights corresponding to the primary colors of R, G, and B are incident to the liquid crystal panels 1110R, 1110B, and 1110G by the dichroic mirror 1108, a color filter may not be provided.

Furthermore, in addition to the electronic device described with reference to FIG. 13, a mobile type personal computer, a cellular phone, a liquid crystal TV, a viewfinder type or monitor direct view type video tape recorder, a car navigation device, a pager, an electronic note, a calculator, a word processor, a workstation, a TV telephone, a POS terminal, a device having a touch panel, and the like may be exemplified. In addition, it is needless to say that the invention may be applied to such electronic apparatuses.

Further, the invention may be applied to a reflection type liquid crystal device (LCOS) forming an element on a silicon substrate, a plasma display (PDP), a field emission display (FED and SED), an organic EL display, a digital micro mirror device (DMD), an electrophorsis device, and the like as well as the liquid crystal device mentioned in the above-described embodiments.

The invention is not limited to the above-described embodiments, but may be appropriately modified in the scope of claims and the scope of the concept or the spirit of the invention can be understood from the entire specification. Of course, an electro-optical device having such modifications and an electronic apparatus having the electro-optical device are also included in the technical scope of the invention.

The entire disclosure of Japanese Patent Application No. 2009-291959, filed Dec. 24, 2009 is expressly incorporated by reference herein.

What is claimed is:

1. An electro-optical device comprising:
a transistor;
a first insulation film that is disposed so as to cover the transistor;
a first conduction layer that is disposed so as to oppose to the transistor via the first insulation film;
a second conduction layer that overlaps with the first conduction layer at an overlapping area seen from a direction from the second conduction layer to the first conduction layer; and
a second insulation film that is disposed between the first conduction layer and the second conduction layer, the second insulation film having a void at the overlapping area, the void being included in the overlapping area seen from a direction from the second conduction layer to the first conduction layer, wherein
the first conduction layer includes a signal line, an image signal being supplied to the signal line, and
the second conduction layer including a fixed potential side electrode of a capacitance element.

2. An electronic apparatus comprising:
the electro-optical device according to claim 1.

3. An electro-optical device comprising:
a transistor;
a data line that is electrically connected to the transistor, an image signal being supplied to the data line;
a pixel electrode, the image signal being applied to the pixel electrode via the transistor;
a capacitance element that is electrically connected to the pixel electrode; and
a capacitance line that is electrically connected to a fixed potential side electrode of the capacitance element, the capacitance line extending as to overlap with the data line;
a first insulation film that is disposed between the transistor and the data line;
a second insulation film that is disposed between the data line and the capacitance line,
the second insulation film having a void at an overlapping area seen from a direction from the capacitance line to the data line, the void being included in the overlapping area seen from the direction from the capacitance line to the data line.

4. The electro-optical device according to claim 3, further comprising:
a plurality of voids that is disposed at the overlapping area seen from the direction from the capacitance line to the data line, the plurality of voids including the void.

5. The electro-optical device according to claim 4, wherein each of the plurality of voids are arranged along the data line.

6. The electro-optical device according to claim 3, further comprising:
a plurality of voids that is disposed at the overlapping area seen from the direction from the capacitance line to the data line.

7. An electro-optical device comprising:
a transistor;
a first insulation film that is disposed so as to cover the transistor;
a first conduction layer that is disposed so as to oppose to the transistor via the first insulation film;
a second conduction layer that overlaps with the first conduction layer at an overlapping area seen from a direction from the second conduction layer to the first conduction layer; and
a second insulation film that is disposed between the first conduction layer and the second conduction layer, the second insulation film having a void at the overlapping area, the void being included in the overlapping area seen from a direction from the second conduction layer to the first conduction layer,
wherein the first conduction layer is a signal line that supplies image signals, and
wherein the second conduction layer is a capacitance line that includes a fixed potential side electrode constituting a capacitance element.

\* \* \* \* \*